US006978007B1

(12) United States Patent
Höfer et al.

(10) Patent No.: US 6,978,007 B1
(45) Date of Patent: Dec. 20, 2005

(54) COMMUNICATIONS SYSTEMS

(75) Inventors: Gerald Höfer, Langerringen (DE);
Peter Caldera, Villach (AT); Paul Kunisch, Puchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/390,497

(22) Filed: Sep. 3, 1999

Related U.S. Application Data

(63) Continuation of application No. PCT/DE98/00632, filed on Mar. 3, 1998.

(51) Int. Cl.[7] ............................................ H04M 1/738
(52) U.S. Cl. .............. 379/347; 379/93.01; 379/221.07; 379/399.01
(58) Field of Search ............................ 379/93.09, 394, 379/398, 404, 414, 93.07, 347, 221.07, 399.01

(56) References Cited

U.S. PATENT DOCUMENTS

| | | | | |
|---|---|---|---|---|
| 4,057,695 A | * | 11/1977 | Ohno | 379/347 |
| 4,805,208 A | * | 2/1989 | Schwartz | 379/93.31 |
| 5,612,948 A | * | 3/1997 | Fette et al. | 370/252 |
| 5,802,164 A | * | 9/1998 | Clancy et al. | 379/347 |
| 6,061,431 A | * | 5/2000 | Knappe et al. | 379/347 |

FOREIGN PATENT DOCUMENTS

| | | | |
|---|---|---|---|
| DE | 1290982 | 3/1969 | |
| DE | 2308103 C2 | 8/1985 | |
| DE | 4139610 A1 | 7/1993 | |
| GB | 2076262 A | 11/1981 | |
| JP | 08251370 A | * 9/1996 | ............ H04N 1/32 |

OTHER PUBLICATIONS

Bigelow, Stephen, J., Understanding Telephone Electronics, Third Edition, Sams, 1993, p. 82.*
Japanese Patent Abstract No. 61066452 (Tatsuya), dated Apr. 5, 1986.
Japanese Patent Abstract No. 58080956 (Yasuo), dated May 16, 1983.

* cited by examiner

*Primary Examiner*—Sinh Tran
*Assistant Examiner*—Daniel Swerdlow
(74) *Attorney, Agent, or Firm*—Laurence A. Greenberg; Werner H. Stemer; Ralph E. Locher

(57) ABSTRACT

The communications system has a transmission network for transmitting useful data and control data. Call numbers are input at a subscriber terminal. A subscriber line unit with an adjustable transmission characteristic is connected between the subscriber terminal and the transmission network. A recognition unit connected to the transmission network recognizes particular call number patterns and outputs particular control signals corresponding to call number patterns. A control unit connected between the recognition unit and the subscriber line unit sets the transmission characteristic of the subscriber line unit depending on the control signals provided by the recognition unit.

11 Claims, 2 Drawing Sheets

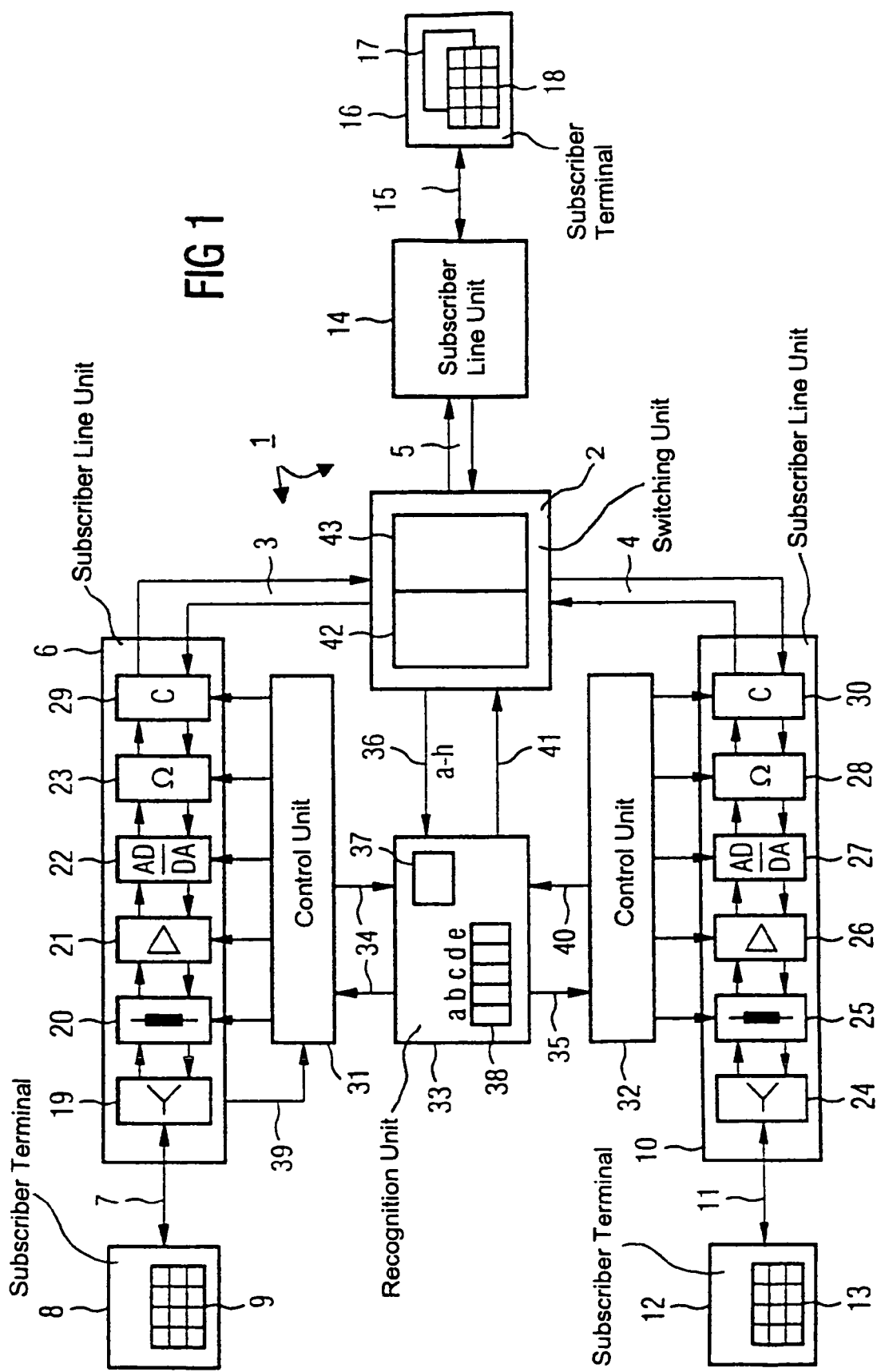

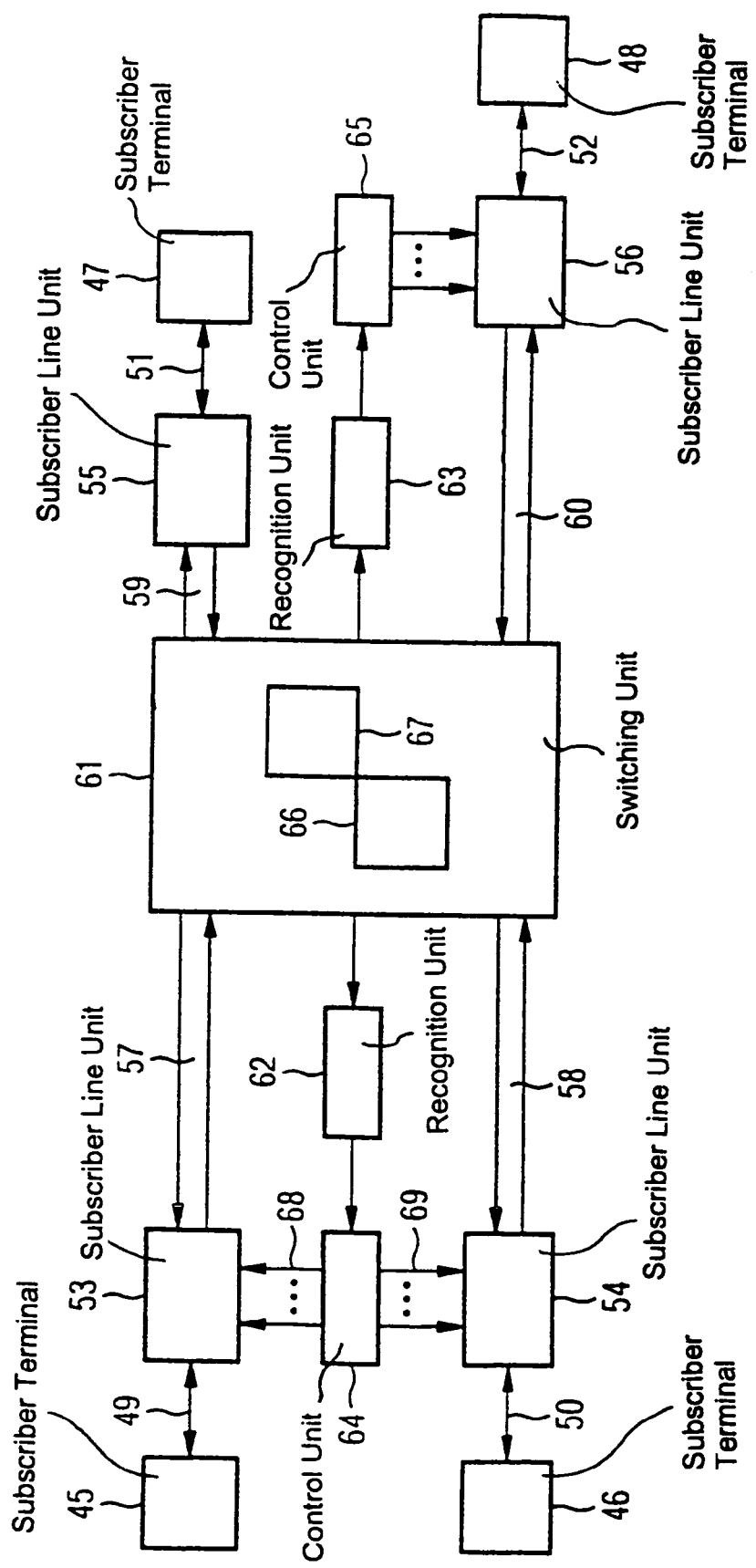

COMMUNICATIONS SYSTEMS

CROSS-REFERENCE TO RELATED APPLICATION

This is a continuation of copending International Application PCT/DE98/00632, filed Mar. 3, 1998, which designated the United States.

BACKGROUND OF THE INVENTION

Field of the Invention

The invention relates to a communications system.

In conventional telecommunications systems, the transmission characteristic of the subscriber line, such as input impedance, line simulation, level and so on, is determined by the system operators on the basis of country-specific factors. However, particularly when different transmission services or transmission types are used, a fixed transmission characteristic can result in the transmission quality and/or transmission rate being impaired, depending on the transmission service or the transmission type.

Patent Abstracts of Japan Vol. 007, No. 174 (E-190), Aug. 2, 1983 & JP 58 080956 A(NIPPON DENKI KK), May 16, 1983 discloses a communications system in which the subscriber can adjust the volume of the voice signals by inputting a number. The disadvantage of this, however, is that the transmission characteristic of the telecommunications system cannot be changed by the subscriber when data signals are being transmitted, for example.

SUMMARY OF THE INVENTION

It is accordingly an object of the invention to provide a communications system, which overcomes the above-mentioned disadvantages of the heretofore-known devices and methods of this general type and wherein the above-mentioned disadvantage does not arise.

With the foregoing and other objects in view there is provided, in accordance with the invention, a communications system with a transmission network for transmitting at least useful signals, comprising:
- at least one subscriber terminal having an input for inputting call numbers;
- at least one subscriber line unit connected between the at least one subscriber terminal and a transmission network of the communications system, the subscriber line unit having an adjustable transmission characteristic;
- a recognition unit connected to the transmission network for recognizing a particular call number pattern and for outputting control signals corresponding to a call number pattern; and
- a control unit connected between the recognition unit and the subscriber line unit for adjusting the adjustable transmission characteristic of the subscriber line unit in dependence on the control signals output by the recognition unit.

In other words, the communications system has a transmission network for transmitting useful signals, and likely also control signals. Call numbers are input at the subscriber terminal(s). One or more subscriber line units with an adjustable transmission characteristic are connected between a respective subscriber terminal and the transmission network. A recognition unit connected to the transmission network recognizes particular call number patterns and outputs particular control signals corresponding to call number patterns. A control unit connected between the recognition unit and the subscriber line unit sets the transmission characteristic of the subscriber line unit depending on the control signals provided by the recognition unit.

In its preferred implementation, the transmission network is a digital transmission network. It comprises, for example, a switching unit which is connected via a respective subscriber line unit to the subscriber terminals by transmission means for transmitting the useful data and possibly the control data. In this arrangement, the subscriber line unit provides the required transmission characteristic and thus also the required line termination characteristic. Suitable subscriber line units comprise, for example, means for two-wire/four-wire conversion, for impedance matching, for gain setting, for frequency response correction, for coding and, in the case of use in a digital transmission network, also for analog-digital and digital-analog conversion. Suitable subscriber line units are line cards, subscriber units in access networks, terminal adapters in ISDN networks and so on. In this arrangement, the subscriber terminal is a telephone, a fax machine, a data terminal and so on, for example. According to the invention, the subscriber terminal has input means for inputting call numbers, such as any type of keypad, and memories which can be selected by corresponding control elements and contain appropriate call numbers, devices for automatically producing particular call numbers and so on. The recognition unit is used to determine, after a subscriber has input a call number, whether a user-specific transmission characteristic can be set. If not, the preset transmission characteristic is retained. The need for a user-specific transmission characteristic can be recognized from the input call number itself, for example, but can also be recognized from dialing information before the call number or from a recognition signal transmitted after the call number. If the recognition unit recognizes the subscriber's corresponding need, then this information is passed on to the control unit using the control signals. The control unit then fully or partly modifies the subscriber line unit's transmission characteristic, which can be changed according to the invention, as desired.

In this arrangement, the values required for setting the transmission characteristic are preferably determined from tables stored in the memories, for example, or by calculating them from the control signals supplied by the recognition unit. This enables the necessary settings to be determined easily.

Accordingly, there is provided, in accordance with a further feature of the invention, a memory unit which stores a combinational logic table with logic combinations of a transmission characteristic of the subscriber line unit with the control signals. Alternatively, a computer unit is programmed to calculate the logic combination of the transmission characteristic of the subscriber line unit with the control signals from the control signals themselves.

In accordance with an added feature of the invention, the transmission network has an adjustable transmission characteristic, the control unit transmits an acknowledgement signal to the transmission network after the transmission characteristic of the subscriber line unit has been set, and the transmission network subsequently adapts the adjustable transmission characteristic to a changed transmission characteristic of the subscriber line unit.

One development of the invention provides that at least two subscriber terminals are connected to the transmission network via a respective subscriber line unit, and that the two subscriber line units are connected to the recognition unit via one or a respective control unit for setting the transmission characteristic of the respective subscriber line unit depending on the control signals provided by the recognition unit.

This means that, when a particular call number pattern is input, the transmission characteristic of the subscriber line unit is set not only for the calling subscriber terminal or the respectively called subscriber terminal, but for both. The advantage of this is that the transmission quality is increased further.

In accordance with an additional feature of the invention, the system further comprises a device connected in the transmission network for checking a transmission quality of a connection of a subscriber terminal and, if the transmission quality has been determined to be of a relatively higher transmission quality, to match the transmission characteristic of the transmission network accordingly. In other words, where the transmission characteristic of the transmission network is variable, the transmission network matches its transmission characteristic accordingly after the means for checking the transmission quality have detected a higher transmission quality in the subscriber line units. This also increases the overall transmission quality. Alternatively, the control unit can transmit an acknowledgement signal to the transmission network after the transmission characteristic provided for the (respective) subscriber line unit has been set. Thereafter, the transmission network then changes its transmission characteristic at least partly.

Preferably, only part of the call number is evaluated by the recognition device and used for the decision as to whether the transmission characteristic of the subscriber line unit can be changed. Thus, for example, particular area codes, particular access numbers or particular call number endings could be used to determine which transmission characteristic is to be set. Evaluating the call numbers alone has the advantage that the additional complexity for recognition is very low.

In accordance with a concomitant feature of the invention, the subscriber line unit includes a coding unit having variable coding characteristic adjustable by the control unit, and/or a filter unit having a frequency response adjustable by the control unit, and/or an amplifier unit having a variable gain/attenuation adjustable by the control unit, and/or an impedance matching unit having an impedance that is adjustable by the control unit.

Furthermore, analog-digital converters and digital-analog converters can also be provided whose converter characteristic can likewise be changed by the control unit. In general, this means that individual properties of the transmission characteristic can advantageously be changed specifically.

Other features which are considered as characteristic for the invention are set forth in the appended claims.

Although the invention is illustrated and described herein as embodied in a communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic view of a first exemplary embodiment of the communications system according to the invention; and FIG. 2 is a block diagram of a second exemplary embodiment of the communications system according to the invention.

DESCRIPTION OF THE PREFERRED EMBODIMENTS

Referring now to the figures of the drawing in detail and first, particularly, to FIG. 1 thereof, there is seen an exemplary embodiment with a transmission network 1 which, in addition to a switching unit 2, has three two-way useful data connections 3, 4, 5. A multiplicity of further useful data connections can also be connected in addition, but these are not shown for reasons of clarity. Hence, only the three above-mentioned connections 3, 4, 5 are represented in the drawing. The useful data connection 3 is connected to a subscriber line unit 6, which for its part is coupled to a subscriber terminal 8 by a two-way twin-wire line 7. The subscriber terminal 8 comprises a keypad 9 for inputting call numbers. In the same way as the subscriber line unit 6 and the subscriber terminal 8, a subscriber line unit 10 is connected to the useful data connection 4. The subscriber line unit 10 is additionally coupled by a two-way twin-wire connection 11 to a subscriber terminal 12 which likewise has a keypad 13 for inputting call numbers. Finally, a subscriber line unit 14 is on the one hand connected to the useful data connection 5 and on the other coupled to a subscriber terminal 16 by a two-way twin-wire connection 15. The subscriber terminal 16 contains a memory 17 for storing call numbers which can be selected using an input panel 18.

The subscriber line units 6 and 10 also comprise a two-wire/four-wire converter 19 and 24, respectively, an impedance matching unit 20 and 25, respectively, for line matching, an amplifier unit/attenuation element 21 and 26, respectively, an analog-digital/digital-analog conversion device 22 and 27, respectively, a filter unit 23 and 28, respectively, and a coding device 29 and 30, respectively. In the configuration, the coding characteristic of the coding unit 29 or 30, the frequency response of the filter unit 23 or 28, the conversion characteristic of the analog-digital/digital-analog converter 22 or 27, the gain/attenuation of the amplifier unit 21 or 26 and the impedance of the impedance matching unit 20 or 25 can be changed by a respective control unit 31 or 32. Each control unit 31 and 32 is connected to the appropriate units 20 to 30 for this purpose. The control units 31 and 32 are each connected by a control line 34 and 35, respectively, to a recognition unit 33 which is connected to the switching unit 2 by a line 36. The switching unit 2 informs the recognition unit of the current call number in each case. This information is compared by a comparator device 37 with call numbers or call number fragments stored in a memory 38, and, if there is any correspondence, an appropriate signal is sent to one of the two or else to both of the control units 31 and 32 via the lines 34 and 35.

The memory thus stores a combinational logic table with a logic combination of the subscriber line unit transmission characteristic with the control signals. In the alternative, the logic combination may be calculated. In that case, the box indicating the recognition unit 33 may be a computer or a processor programmed to calculate a logic combination of the transmission characteristic of the subscriber line unit with the control signals from the control signals themselves.

Accordingly, there are in principle three distinguishable operating states: namely, the subscriber line unit is matched to the calling station or to the remote station or else to both stations. In this arrangement, if a call is made from the subscriber terminal 16 or else the subscriber terminal 16 is called, for example, then only the remote station can be matched, because the subscriber line unit 14 cannot be changed, unlike the two subscriber line units 6 and 10.

After setting has been carried out for the subscriber line unit 6, the subscriber line unit 6 produces an acknowledgement signal 39 which is passed on to the recognition unit 33 via the control unit 31. After the subscriber line unit 10 has been set, the associated control unit 32 produces a further acknowledgement signal 40 which is likewise passed on to the recognition unit 33. The recognition unit 33 in turn produces an aggregate acknowledgement signal 41 from the two acknowledgement signals 39 and 40, and this aggregate acknowledgement signal is passed to an evaluation device 42 in the switching unit 2. The evaluation device 42 then controls a corresponding matching device 43 such that the transmission quality between the two subscriber terminals 8 and 12 is at an optimum.

To recognize a call number resulting in the transmission characteristic being changed, only the first five digits a to e of an eight-digit call number a to h are evaluated in the present example. In the same way, the whole number or any desired parts of the call number could also be used, however. Hence, if a particular service provider such as Internet services, fax services etc. is dialed, then the call number automatically indicates what the service is and how the appropriate change to the transmission characteristic is to be made. The originally preset characteristic is eventually set again at the end of the connection.

Referring now to the exemplary embodiment of FIG. 2, four subscriber terminals 45 to 48, representing further subscriber terminals, are connected to a switching unit 61 via respective twin-wire connections 49 to 52, subscriber line units 53 to 56 connected to the latter and respective useful data connections 57 to 60 downstream of the subscriber line units 53 to 56. In addition, the switching unit 61 has two recognition units 62 and 63 connected to it, each of which has a control device 64 and 65, respectively, connected downstream. In this arrangement, the control unit 64 controls the transmission characteristic both of the subscriber line unit 53 and of the subscriber line unit 54. In contrast, the control unit 65 controls only the subscriber line unit 56. The subscriber line unit 55 cannot be controlled.

If, by way of example, a particular call number, for example the call number of a data service provided by means of the subscriber terminal 46, is dialed on the subscriber terminal 45, then the recognition unit 62 recognizes from the call number that pure data transmission is to take place and passes on this information to the control unit 64. The control unit 64 eventually sets the transfer characteristics of the two subscriber line units 53 and 54 such that they are optimum for data transmission. A monitoring device 66 in the switching unit 61 recognizes the improved transmission characteristic of the subscriber line units 53 and 54 from appropriate measurements or from the signal response and subsequently uses a matching device 67 to match the transmission characteristic of the transmission network accordingly as well, i.e. in this case the useful data connections 57 and 58 and the switching unit 61. This enables a higher transmission rate to be achieved, for example.

If one control unit, such as the control unit 64, controls a plurality of subscriber line units, such as the subscriber line units 53 and 54, then the control unit 64 together with the recognition unit 62 can be installed centrally, for example, that is to say in the immediate vicinity of the switching unit 61 or even in it. The drive signals for the subscriber line units 53 and 54 are then transmitted by means of drive signal connections 68 and 69 in the transmission network. On the other hand, the control unit, like the control unit 65, for example, can also be arranged locally in the immediate vicinity of the subscriber line unit 56 or even actually in it. It is possible to arrange the recognition unit 63 either centrally for the switching unit 61 or locally for the subscriber line unit 56.

We claim:

1. A communications system with a transmission network for transmitting useful signals, comprising:
   (a) at least one subscriber terminal for inputting call numbers;
   (b) at least one subscriber line unit connected between said at least one subscriber terminal and the transmission network of the communications system, said at least one subscriber line unit including a coding device, a filter unit, an analog-digital/digital-analog converter, an amplifier unit, and an impedance matching unit;
   (c) a separate recognition unit connected to the transmission network for recognizing a particular call number pattern and for outputting a control signal corresponding to a recognized particular call number pattern; and
   (d) a separate control unit connected between said recognition unit and said subscriber line unit, said separate control unit adjusting a coding characteristic of said coding device, a frequency response of said filter unit, a conversion characteristic of said analog-digital/digital-analog converter, a gain/attenuation of said amplifier unit, and an impedance of said impedance matching unit in dependence on the control signals output by said recognition unit.

2. The communications system according to claim 1, wherein the transmission network has an adjustable transmission characteristic, said control unit transmits an acknowledgement signal to the transmission network after the transmission characteristic of said subscriber line unit has been set, and the transmission network subsequently adapts the adjustable transmission characteristic to a changed transmission characteristic of the subscriber line unit.

3. The communications system according to claim 1, wherein the transmission network has an adjustable transmission characteristic, and the system further comprises a device connected in the transmission network for checking a transmission quality of a connection of a subscriber terminal and, if the transmission quality has been determined to be of a relatively higher transmission quality, to match the transmission characteristic of the transmission network accordingly.

4. The communications system according to claim 1, which further comprises a memory unit storing in a combinational logic table a logic combination of a transmission characteristic of said subscriber line unit with the control signals.

5. The communications system according to claim 1, which further comprises a computer unit programmed to calculate a logic combination of a transmission characteristic of said subscriber line unit with the control signals from the control signals themselves.

6. The communications system according to claim 1, wherein said at least one subscriber terminal has an input device for inputting call numbers.

7. A communications system with a transmission network for transmitting useful signals, comprising:
(a) at least two subscriber terminals including a calling subscriber terminal and a called subscriber terminal;
(b) a subscriber line unit for each said at least two subscriber terminals, connecting each subscriber terminal to the transmission network of the communications system, each said subscriber line unit including a coding device, a filter unit, an analog-digital/digital-analog converter, an amplifier unit, and an impedance matching unit;
(c) a separate recognition unit connected to the transmission network for recognizing a particular call number pattern and for outputting a control signal corresponding to a recognized particular call number pattern; and
(d) a separate control unit connected between said recognition unit and said subscriber line unit, said separate control unit adjusting a coding characteristic of said coding device, a frequency response of said filter unit, a conversion characteristic of said analog-digital/digital-analog converter, a gain/attenuation of said amplifier unit, and an impedance of said impedance matching unit in dependence on the control signals output by said recognition unit.

8. The communications system according to claim 7, wherein the transmission network has an adjustable transmission characteristic, said control unit transmits an acknowledgement signal to the transmission network after the transmission characteristic of said subscriber line unit has been set, and the transmission network subsequently adapts the adjustable transmission characteristic to a changed transmission characteristic of the subscriber line unit.

9. The communications system according to claim 7, wherein the transmission network has an adjustable transmission characteristic, and the system further comprises a device connected in the transmission network for checking a transmission quality of a connection of at least one of said at least two subscriber terminals and, if the transmission quality has been determined to be of a relatively higher transmission quality, to match the transmission characteristic of the transmission network accordingly.

10. The communications system according to claim 7, which further comprises a memory unit storing in a combinational logic table a logic combination of a transmission characteristic of said subscriber line unit with the control signals.

11. The communications system according to claim 7, which further comprises a computer unit programmed to calculate a logic combination of a transmission characteristic said subscriber line unit with the control signals from the control signals themselves.

* * * * *

UNITED STATES PATENT AND TRADEMARK OFFICE
CERTIFICATE OF CORRECTION

PATENT NO. : 6,978,007 B1 Page 1 of 1
DATED : December 20, 2005
INVENTOR(S) : Gerald Höfer et al.

It is certified that error appears in the above-identified patent and that said Letters Patent is hereby corrected as shown below:

<u>Title page,</u>
Item [30], Foreign Application Prority Data, should read
-- Mar 3, 1997 (DE) ................... 197 08 525 --.

Signed and Sealed this

Fourteenth Day of February, 2006

JON W. DUDAS
*Director of the United States Patent and Trademark Office*